United States Patent [19]
Coffey et al.

[11] Patent Number: 5,997,069
[45] Date of Patent: Dec. 7, 1999

[54] REMOVABLE VEHICLE SEAT ASSEMBLY

[75] Inventors: Robert T. Coffey, Canton, Mich.; David M. Pascoe, Newmarket; Rufolf Gruber, Carlemond, both of Canada; Brian W. Staley, Birmingham; Foster Van Doren, Milford, both of Mich.

[73] Assignee: Magna Interior Systems, Inc., Markham, Canada

[21] Appl. No.: 09/110,443

[22] Filed: Jul. 7, 1998

Related U.S. Application Data

[60] Provisional application No. 60/051,839, Jul. 7, 1997.

[51] Int. Cl.⁶ ........................................................ B60N 1/02
[52] U.S. Cl. ...................................... 296/65.03; 296/65.01
[58] Field of Search ............................... 296/65.01, 65.03; 248/503.1; 292/201, 216; 297/130

[56] References Cited

U.S. PATENT DOCUMENTS

| | | |
|---|---|---|
| 3,460,791 | 8/1969 | Judd . |
| 3,531,154 | 9/1970 | Fleche . |
| 4,194,782 | 3/1980 | Itoh . |
| 4,700,989 | 10/1987 | Ercilla .............................. 296/65.03 X |
| 4,759,580 | 7/1988 | Berklich, Jr. et al. ............... 296/65.03 |
| 4,773,693 | 9/1988 | Premji et al. ........................ 296/65.03 |
| 4,865,377 | 9/1989 | Musser et al. ....................... 296/65.03 |
| 4,971,379 | 11/1990 | Rumpel et al. . |
| 5,372,398 | 12/1994 | Aneiros et al. . |
| 5,482,345 | 1/1996 | Bolsworth et al. .................. 296/65.03 |
| 5,496,088 | 3/1996 | Stewart . |
| 5,562,322 | 10/1996 | Christoffel .......................... 296/65.03 |
| 5,577,805 | 11/1996 | Glinter et al. .................... 296/65.03 X |
| 5,626,391 | 5/1997 | Miller et al. ..................... 296/65.03 X |
| 5,634,686 | 6/1997 | Okazaki ........................... 296/65.03 X |
| 5,765,894 | 6/1998 | Okazaki et al. ..................... 296/65.03 |

*Primary Examiner*—D. Glenn Dayoan
*Assistant Examiner*—Lori L. Coletta
*Attorney, Agent, or Firm*—Pillsbury Madison & Sutro LLP

[57] ABSTRACT

The present invention is a removable vehicle seat assembly for use with a motor vehicle having an interior floor structure with at least a portion thereof covered by a yieldingly deformable material. A latch and release assembly is operatively associated with a riser support structure. The latch and release assembly is configured to be engaged with front and rear anchor members of the interior floor structure and releasably locked in one of a range of releasably locked positions. The latch and release assembly is constructed to be engaged with the front and rear anchor members and releasably locked in an initial one of the range of releasably locked positions. The removable vehicle seat assembly is moved downwardly towards the interior floor structure in response to an application of a downwardly directed force thereto when the latch and release assembly is releasably locked in the initial one of the range of releasably locked positions such that the yieldingly deformable material is yieldingly compressed to a decreased thickness. The latch and release assembly moves progressively from the initial one of the range of releasably locked positions to a subsequent one of the range of releasably locked positions corresponding to the decreased thickness of the yieldingly deformable material during downward movement of the removable vehicle seat assembly. The latch and release assembly is engaged with the front and rear anchor members and releasably locked in the subsequent one of the range of releasably locked positions to thereby prevent upward movement of the removable vehicle seat assembly away from the interior floor structure and to maintain the yieldingly deformable material at the aforesaid decreased thickness.

31 Claims, 10 Drawing Sheets

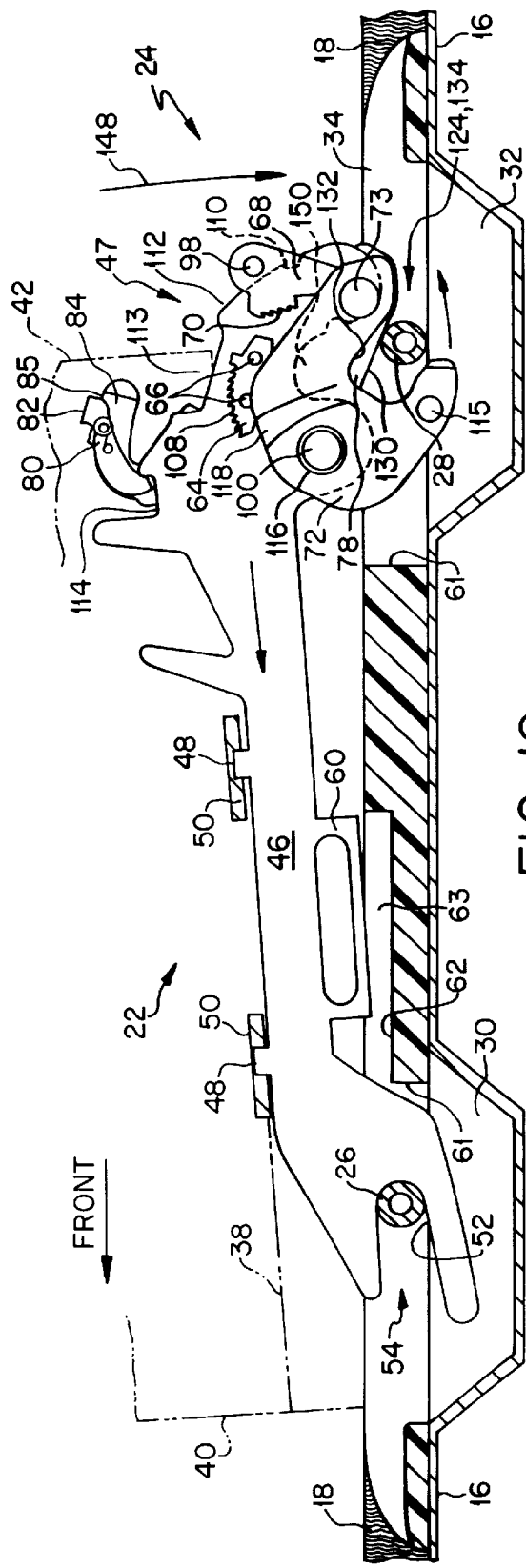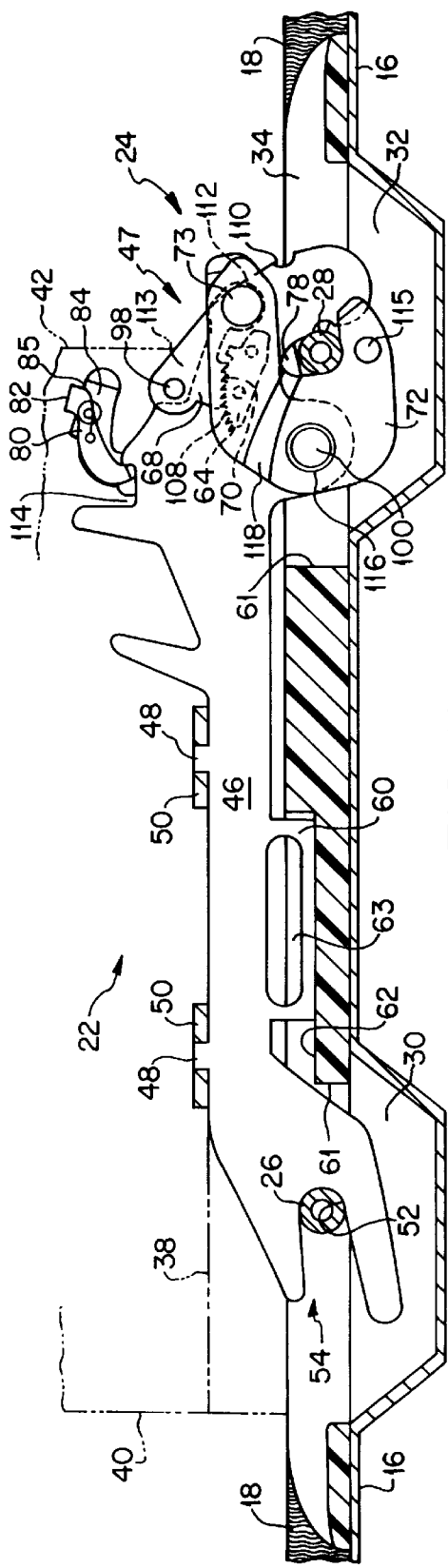
FIG. 10
FIG. 11

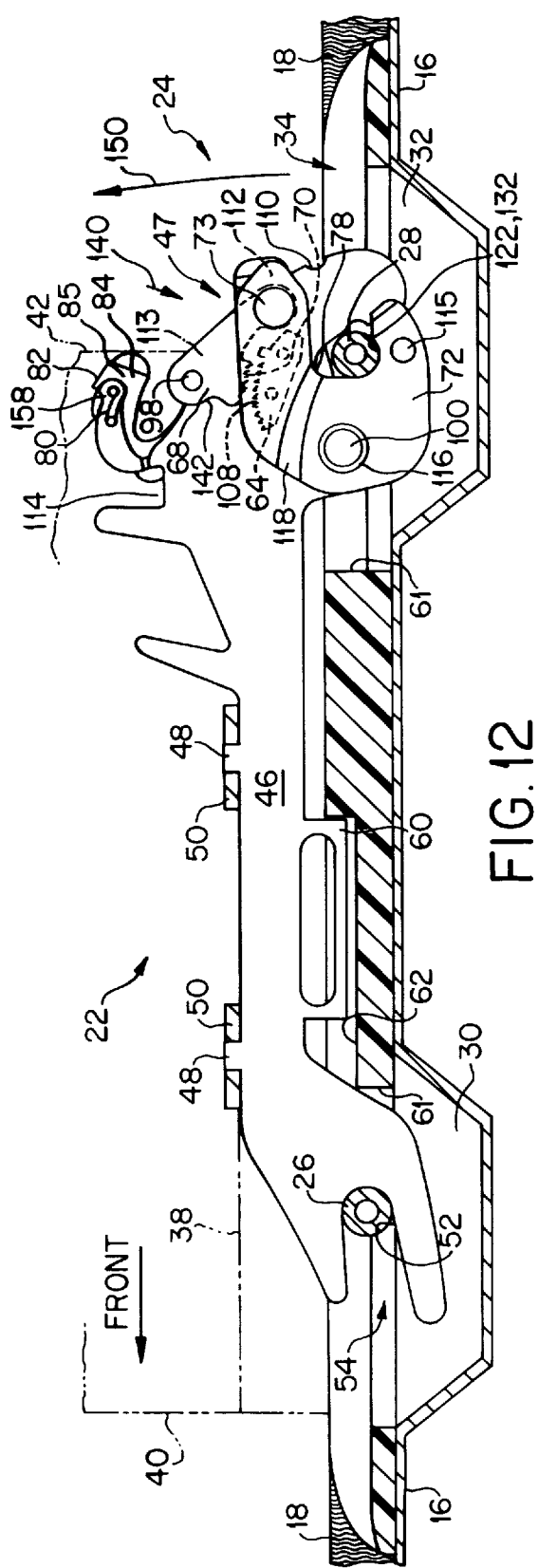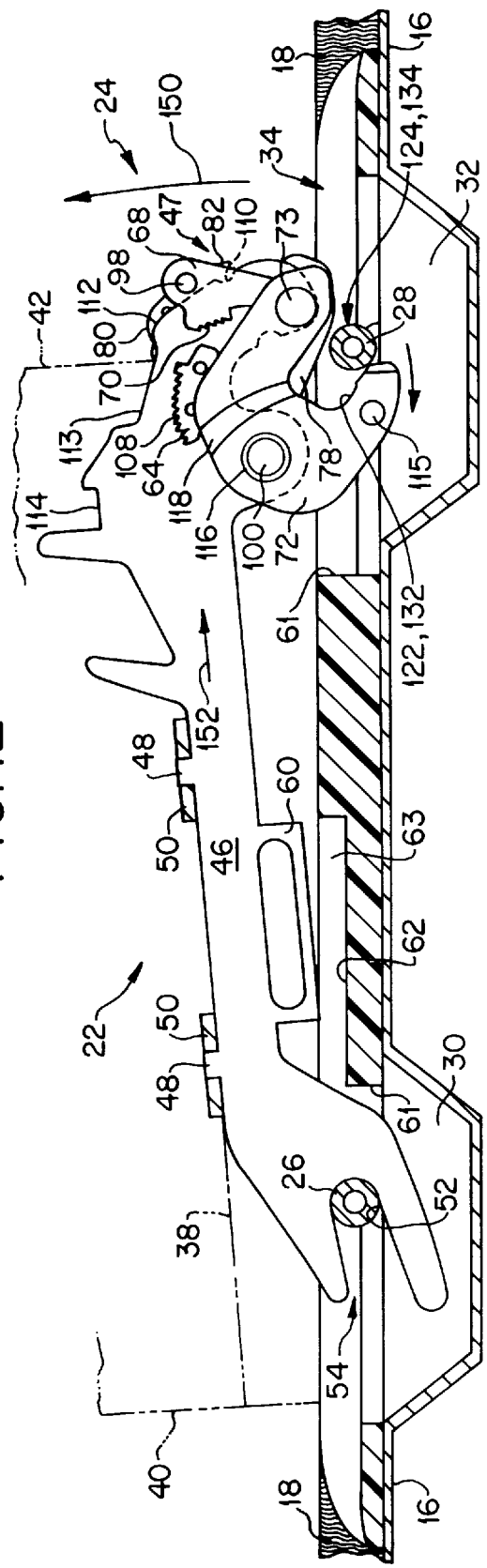

REMOVABLE VEHICLE SEAT ASSEMBLY

This application claims benefit of Provisional Application Serial Number 60/051,839 filed Jul. 7, 1997.

The present invention is related to removable vehicle seat assemblies for use in motor vehicles.

The nature of vans, sport utility vehicles, and other vehicles with relatively large cargo carrying capabilities makes it oftentimes desirable to increase the cargo carrying space in the rearward portion of the vehicle. In order to accomplish this, it has been known to provide a vehicle seat assembly which can be disengaged from its operative position on the floor of the vehicle and removed outwardly through the rear door. Such removal creates extra cargo space that was previously occupied by the seat assembly. The conventional removable seat assembly is mounted on top of a riser support structure. The riser support structure typically has a forwardly facing slot formed in a structure depending downwardly therefrom and a latch and release mechanism provided on a lower rearward portion thereof. The forwardly facing slot and the latch and release mechanism are configured to engage with front and rear anchor members extending across wells formed in the floor of the vehicle.

To install the conventional removable seat assembly, the forwardly facing slot is engaged with the front anchor member and the assembly is pivoted downwardly until the latch and release mechanism engages the rear anchor member. The latch and release mechanism is then moved to a releasably locked position to thereby secure the seat assembly in its operative position.

However, the latch and release mechanism of the conventional removable seat assembly typically has only one releasably locked position. This one locked position is usually set so that a carpet or other yieldingly deformable material can be accommodated between the lower surface of the riser structure and the upwardly facing surface of the floor. By way of example, if a ¼" carpet were to cover the floor of the vehicle, the latch and release mechanism would be constructed so as to provide sufficient space between the riser structure and the floor to accommodate a ¼" carpet when the latch and release mechanism is in locked position. This arrangement can oftentimes be undesirable due to the tendency for yieldingly deformable materials such as carpets to wear over time and become reduced in thickness. Also, the manufacturing errors of either the seat assembly or the floor structure can affect the amount of space provided between the riser structure and the floor. In situations where the carpet has become reduced in thickness or too much space is otherwise provide between the riser structure and the floor, the seat assembly can then move vertically and/or horizontally relative to the vehicle floor. This relative movement usually results in an annoying rattling noise during the operation of the vehicle.

It is therefore an object of the present invention to overcome the shortcomings of the conventional seat assemblies known heretofore. In accordance with the principles of the present invention, there is provided a removable vehicle seat assembly for use with a motor vehicle having an upwardly facing interior floor structure with at least a portion thereof covered by a yieldingly deformable material. The interior floor structure has front and rear anchor members fixedly mounted thereon. The removable vehicle seat assembly comprises a seat assembly constructed and arranged to support an occupant seated thereon when the removable vehicle seat assembly is removably mounted in an operative position on the interior floor structure of the motor vehicle. A riser support structure is constructed and arranged to engage the interior floor structure and support the seat assembly when the removable vehicle seat assembly is removably mounted in the operative position thereof.

A manually operable latch and release assembly is operatively associated with the riser support structure. The latch and release assembly is positioned and configured to be engaged with the front and rear anchor members of the interior floor structure and releasably locked in one of a range of releasably locked positions when the removable vehicle seat assembly is removably mounted in the operative position thereof. The latch and release assembly cooperates with the front and rear anchor members of the interior floor structure to thereby removably retain the removable vehicle seat assembly in the operative position thereof when the latch and release assembly is engaged with the front and rear anchor members and releasably locked in one of the range of releasably locked positions thereof. The latch and release assembly is movable to a released position in response to manual operation when engaged with the front and rear anchor members of the interior floor structure to thereby allow an operator to disengage the latch and release assembly from the front and rear anchor members of the interior floor structure so as to allow the removable vehicle seat assembly to be moved out of the operative position thereof and removed from the motor vehicle.

The latch and release assembly is constructed and arranged to be engaged with the front and rear anchor members and releasably locked in an initial one of the range of releasably locked positions during movement of the removable vehicle seat assembly into said operative position thereof. The removable vehicle seat assembly is moved downwardly towards the interior floor structure in response a downwardly directed force being applied thereto when the latch and release assembly is engaged with the front and rear anchor members and releasably locked in the initial one of the range of releasably locked positions such that the yieldingly deformable material covering at least a portion of the interior floor structure is yieldingly compressed to a decreased thickness between the riser support structure and the interior floor structure. The latch and release assembly moves progressively from the initial one of the range of releasably locked positions to a subsequent one of the range of releasably locked positions corresponding to the decreased thickness of the yieldingly deformable material during such downward movement of the removable vehicle seat assembly. The latch and release assembly is to prevent upward movement of the removable vehicle seat assembly away from the interior floor structure and to maintain the yieldingly deformable material at the aforesaid decreased thickness when the latch and release assembly is engaged with the front and rear anchor members and releasably locked in the subsequent one of the range of releasably locked positions.

Another problem which occurs with conventional removable seat assemblies is that the seat assembly can be misaligned when the forwardly facing slot is engaged with the front anchor member. If this misalignment is more than a nominal amount, then the latch and release mechanism located at the rearward portion thereof will be forced downwardly into engagement with the interior floor structure of the vehicle rather than being received within the well associated with the rear anchor member. If the vehicle seat assembly is of enough weight or a significant amount of downward force is applied to the seat during such pivotal movement, the components of the latch and release mechanism may become damaged or loosened as a result of the mechanism engaging the floor structure. If such damage is allowed to occur to the latch and release mechanism, it is likely that the vehicle owner will have to pay for the costs associated with repairing the latch and release mechanism.

Thus, there exists a need for a removable vehicle seat assembly which is constructed so as to prevent the latch and release mechanism from moving downwardly into engagement with the floor in situations where the seat is improperly aligned during the installation thereof. Another object of the present invention is to provide such a removal vehicle seat assembly. In accordance with the principles of another aspect of the present invention, there is provided a removable vehicle seat assembly for use with a motor vehicle having an interior floor structure with an upwardly facing surface and front and rear anchor members. The interior floor structure has an upwardly facing seat alignment opening provided thereon generally between the front the rear anchor members. The removable vehicle seat assembly comprises a seat structure constructed and arranged to support an occupant seated thereon when the removable vehicle seat assembly is removably mounted in an operative position on the interior floor structure of the motor vehicle.

A riser support structure is constructed and arranged to support the seat structure when the removable vehicle seat assembly is removably mounted in the operative position thereof. A manually operable latch and release assembly is operatively associated with the riser support structure. The latch and release assembly is positioned and configured to be engaged with the front and rear anchor members of the interior floor structure when the removable vehicle seat assembly is removably mounted in the operative position thereof. The latch and release assembly includes a latch and release mechanism associated with one end of the riser support structure. The latch and release mechanism is constructed and arranged to be engaged with one of the front and rear anchor members and releasably locked in a releasably latched position when the removable vehicle seat assembly is removably mounted in the operative position thereof. The latch and release mechanism cooperates with the front and rear anchor members to removably retain the vehicle seat assembly in the operative position when the latch and release mechanism is in the releasably latched position. The latch and release is movable to a released position in response to manual operation when the latch and release assembly is engaged with the front and rear anchor members to thereby allow an operator to disengage the latch and release assembly from the front and rear anchor members so as to allow the removable vehicle seat assembly to be moved out of the operative position thereof and removed from the motor vehicle.

A seat alignment member depends downwardly from the removable vehicle seat assembly. The seat alignment member is positioned and configured to be removably received within the seat alignment opening provided on the interior floor structure generally between the front and rear anchor members during downward movement of the seat assembly towards and into the operative position thereof such that the latch and release mechanism is allowed to engage the one of the front and rear anchor members and be releasably locked in the releasably latched position thereof. The seat alignment member is positioned and configured to engage the upwardly facing surface of the interior floor structure when the removable vehicle seat assembly is improperly aligned with respect to the front and rear anchor members and being moved downwardly towards the interior floor structure such that latch and release assembly is prevented from engaging the upwardly facing surface of the interior floor structure.

Other objects, features, and advantages of the present invention will become apparent from the following detailed description and the appended drawings.

BRIEF DESCRIPTION OF THE DRAWINGS

FIG. 10 of the drawings is a left side elevation view of the latch and release mechanism showing the components in an initially engaged position, with respect to the rear anchor member.

FIG. 11 of the drawings is a left side elevation view of the latch and release mechanism showing the mechanism releasably locked with the rear anchor member.

FIG. 12 of the drawings is a left side elevation view of the latch and release mechanism showing movement of the latching mechanism to the released position.

FIG. 13 of the drawings is a left side elevation view of the latch and release mechanism showing the in a released position before removal from the rear anchor member.

DETAILED DESCRIPTION OF THE PREFERRED EMBODIMENT OF THE INVENTION

Figure 1:
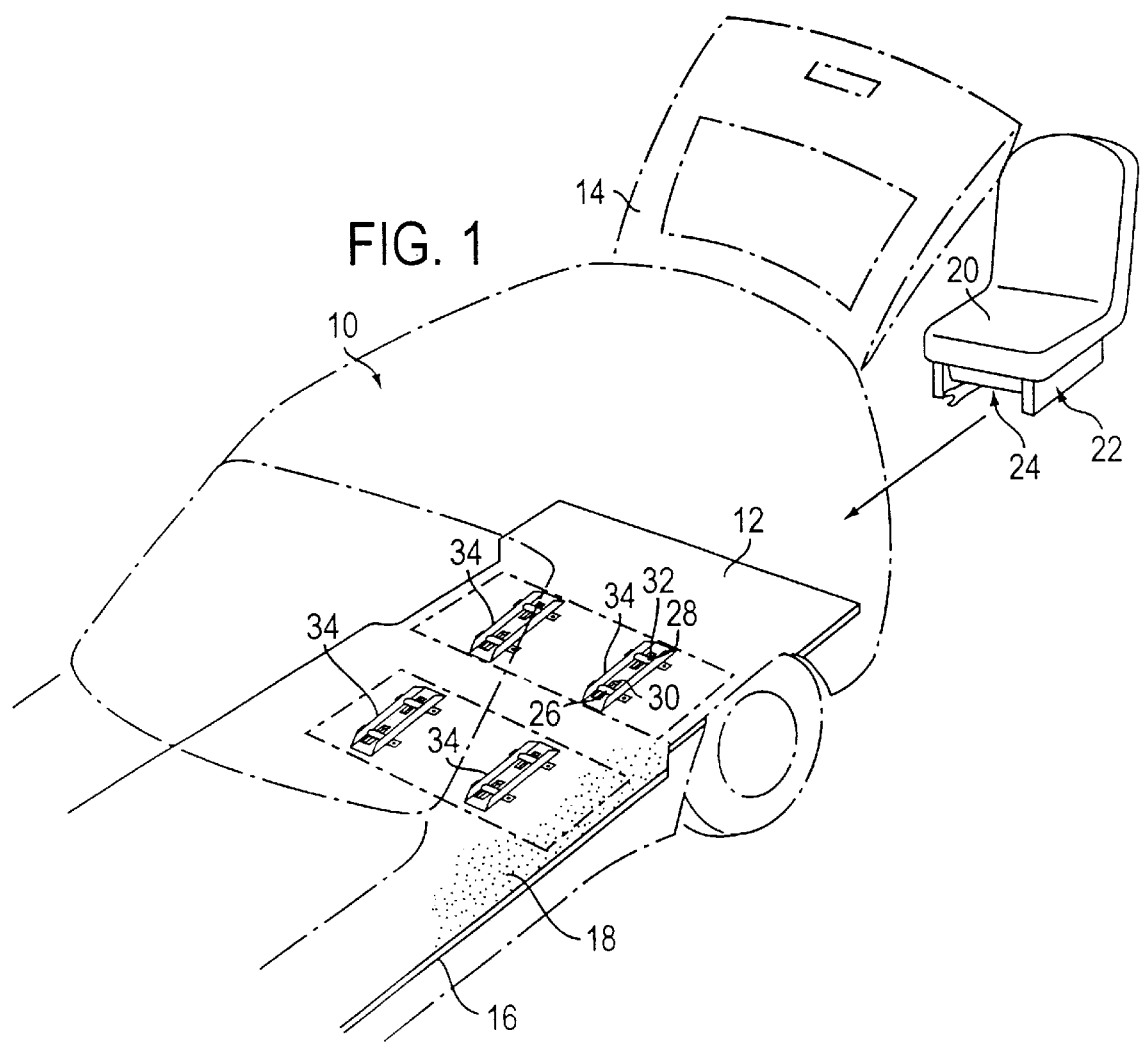
FIG. 1 of the drawings is a front perspective view of a removable vehicle seat assembly embodying the principles of the present invention shown after removal of the seat assembly from the rear of a van-type vehicle.

Referring now more particularly to the drawings, there is shown therein a vehicle 10 of the van type which includes an interior floor structure, generally indicated at 12. The interior floor structure 12 includes a rear area which is open to the rear but closed by an upwardly swinging rear door 14. The interior floor structure 12 is provided by a metal floor pan 16 covered by a yieldingly deformable material in the form of a carpet 18. The accessible rear area of the vehicle 10 is constructed and arranged such that a removable seat assembly, generally indicated at 20, constructed in accordance with the principles of the present invention can be removably mounted in an operative position within the vehicle. As shown, the seat assembly 20 is a simple bucket seat of the type which is mounted in the rear of the van-type vehicle 10 alongside a similar bucket seat. The seat assembly 20, however, may be of any type as long as it supports an occupant seated thereon when the seat assembly 20 is mounted in its operative position. The seat assembly 20 includes a removable riser support structure, generally indicated at 22, by which it is removably mounted and supported in its operative position to the interior floor structure 12 of the vehicle 10.

Figure 4:
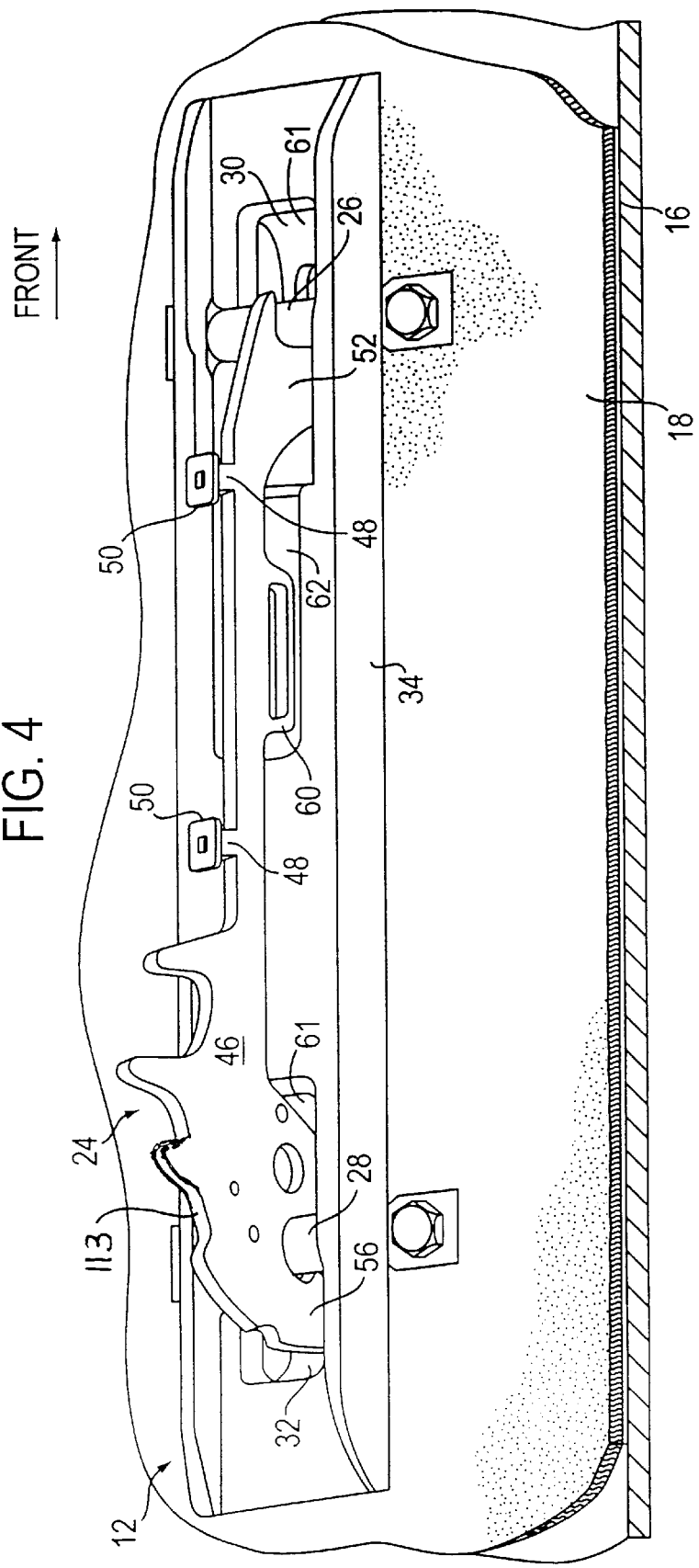
FIG. 4 of the drawings is a right side perspective view of a pad-like member used in positioning and installing the seat shown in FIG. 1 with a latch and release mechanism removed.
Figure 5:
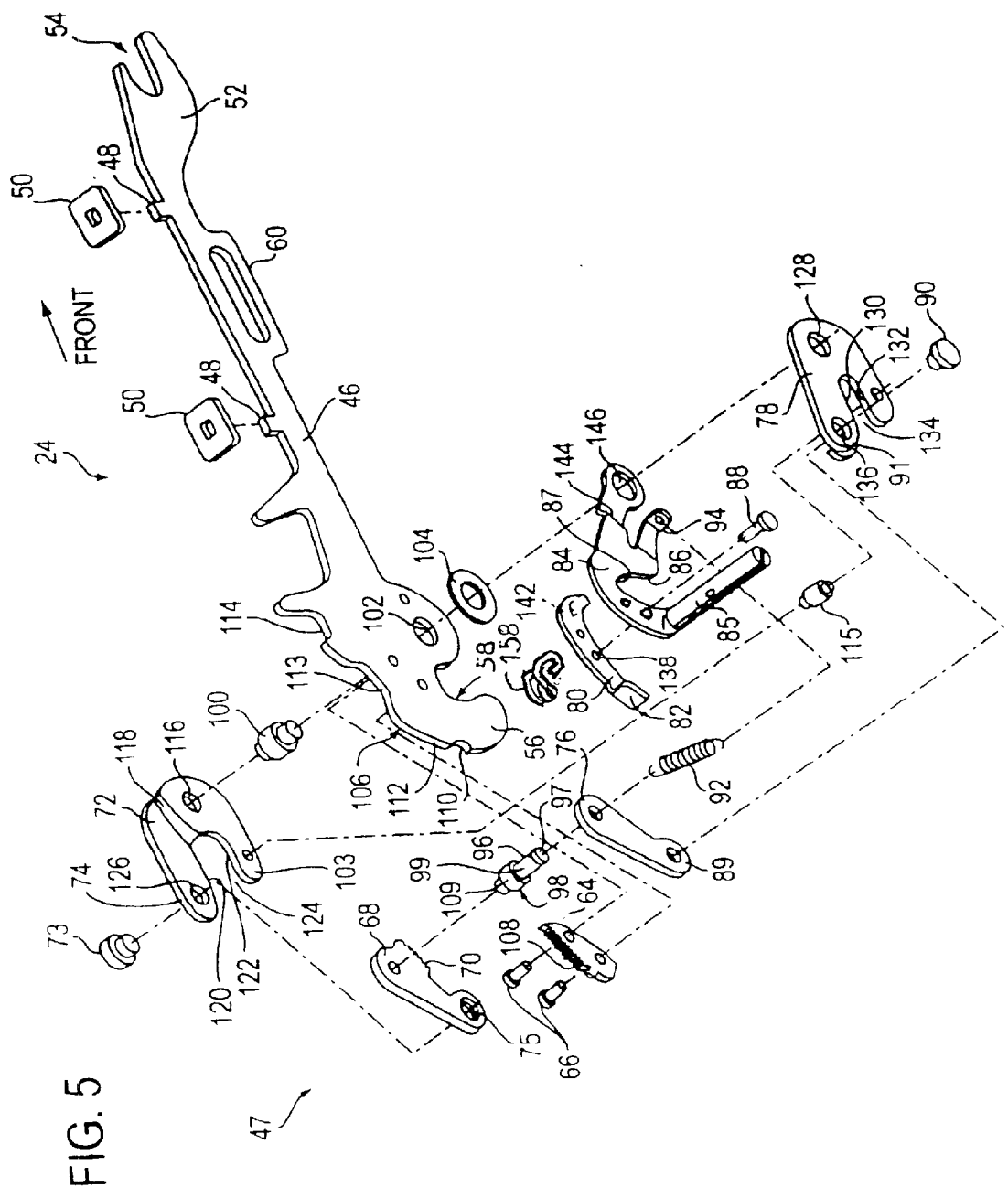
FIG. 5 of the drawings is a rear perspective, exploded view of the latch and release mechanism.

The riser support structure 22 is provided with a manually operable latching and releasing assembly, generally indicated at 24. As shown in FIG. 1, the seat assembly 20 may be easily inserted or removed through the rear access door 14 of the vehicle 10 when swung open. The interior floor structure 12 of the vehicle 10 supports the seat assembly 20 in its operative position when inserted therein. It can be appreciated that a multiplicity of seating arrangements can be accommodated within the vehicle. In the illustrated embodiment, the floor structure 12 of the vehicle 10 is shown as accommodating the seat assembly 20 by the provision of a front seat anchor member 26 and a rear seat anchor member 28. Each anchor member 26 and 28 is preferably in the form of a conventional attaching pin fixed by bolts or the like at opposite ends to the metal floor pan 16. The front anchor member 26 extends transversely over a front well or pocket 30 formed in the floor pan 16 and the rear anchor member 28 extends transversely over a similar rear well or pocket 32. As best shown in FIG. 4, the carpet 18 may be cut out in the area of the front and rear wells 30 and 32 and replaced by a different yieldingly deformable material in the form of a pad-like member 34, molded of a suitable plastic material.

Figure 2:
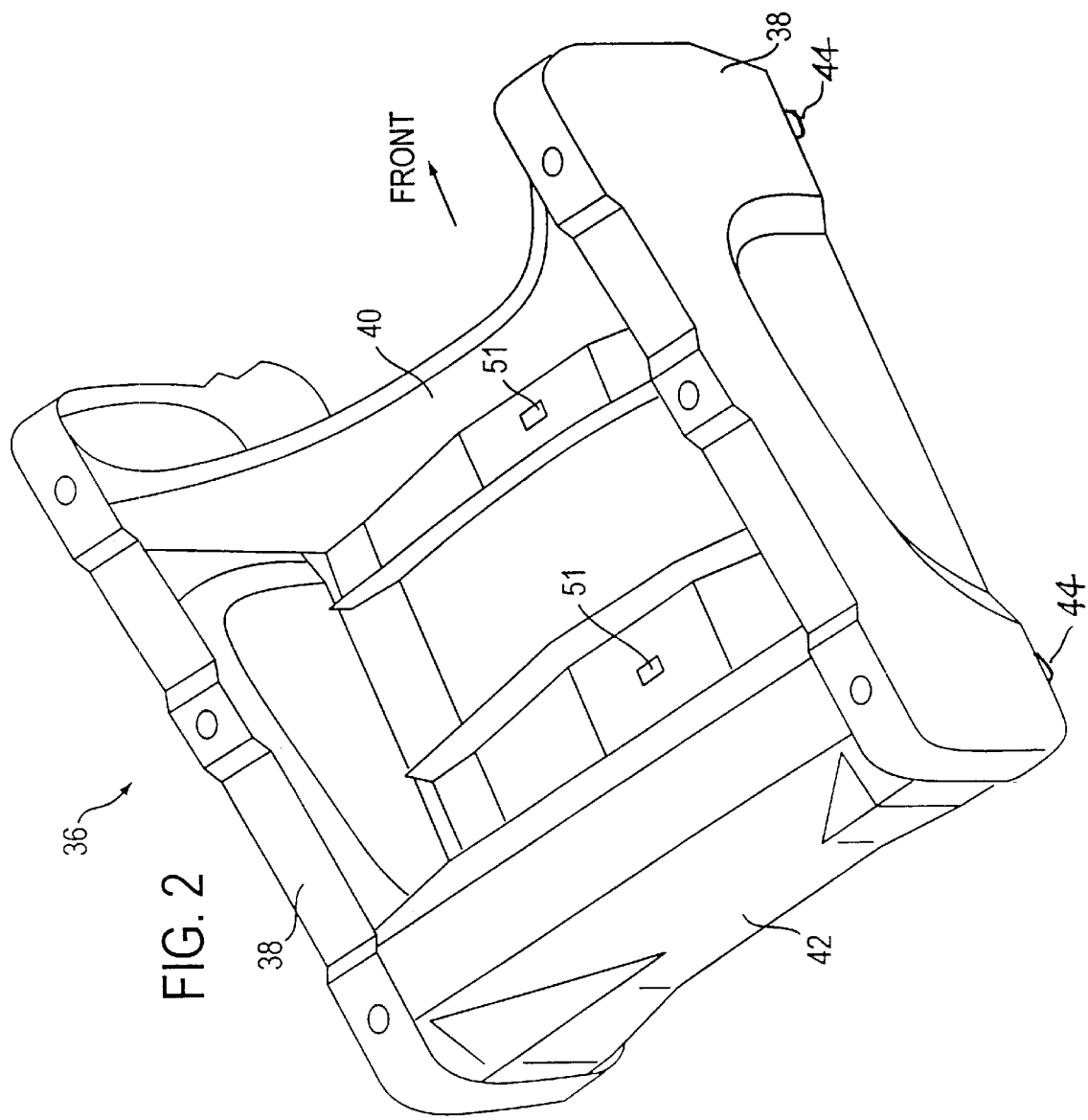
FIG. 2 of the drawings is a rear perspective view of the riser support structure embodied in the seat assembly shown in FIG. 1.
Figure 3:
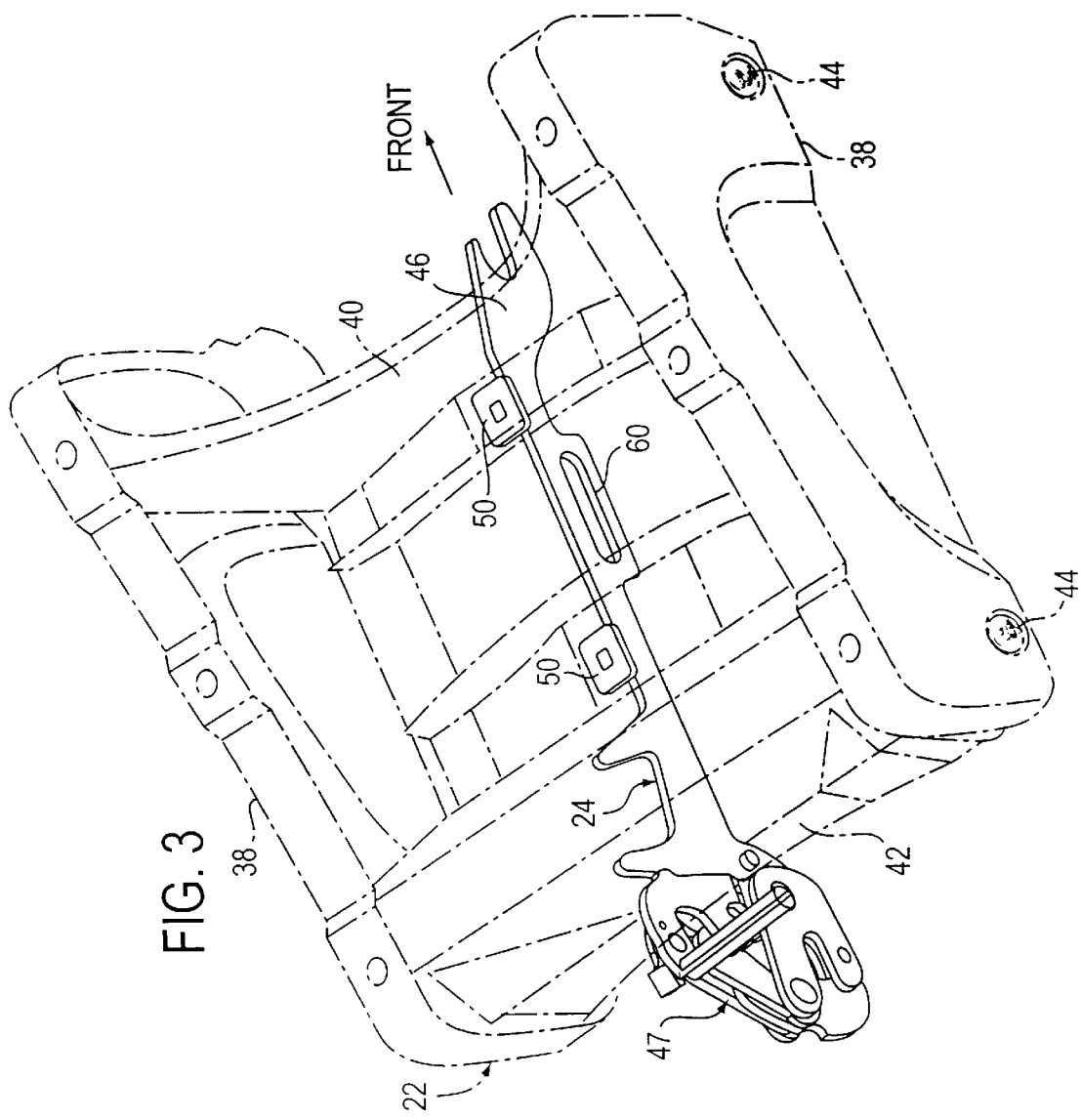
FIG. 3 of the drawings is a rear perspective view of the riser support structure of the seat assembly shown in FIG. 1, the riser support structure being shown in phantom to more clearly illustrate the latch and release mechanism.

The riser support structure 22 includes a riser structure, generally indicated at 36, to which the associated seat latching and releasing assembly 24 is attached. As best shown in FIG. 2, the riser structure 36 is formed of a pair of risers 38 rigidly interconnected in transversely spaced relation by a front stamping 40 and a rear stamping 42 suitably welded thereto. Fixedly mounted on the lower portion of the riser structure 36 is a pair of longitudinally-spaced rubber mounting pads 44.

Referring now more particularly to FIGS. 3 through 7 of the drawings, the manually operable latching and releasing assembly 24 comprises a main support member 46 and a latch and release mechanism 47. Basically, the latch and release assembly 24 is positioned and configured to be engaged with the front and rear anchor members 26, 28 and releasably locked in one of a range of releasably locked positions when the removable vehicle seat assembly 20 is removably mounted in its operative position. The latch and release mechanism is releasably locked in one of a range of releasably latched positions in order to provide the latch and release assembly with the range of releasably locked positions.

The main support member 46 is formed of sheet metal having a pair of longitudinally-spaced riser securing tabs 48 (FIG. 4) extending upwardly along the upper edge thereof. Although weld beads are another means of attachment in like devices, the staked washer means of attachment is used in the present invention. The tabs 48, together with a pair of fasteners 50, serve to fixedly attach the support member 46 to the forward and rearward stampings 40 and 42 of the riser structure 36 at a pair of rectangular openings 51 (FIG. 2). The support member 46 includes a front anchor engaging member 52 having a forwardly opening slot 54 therein which is configured to removably engage the front anchor member 26. The support member 46 also includes a fixed projection 56 depending downwardly therefrom and having a forwardly facing surface 58, which is adapted to engage the rear anchor member 28. Formed on a forward central section of the support member 46 in depending relation to the lower edge thereof is a seat alignment member 60.

Figure 9:
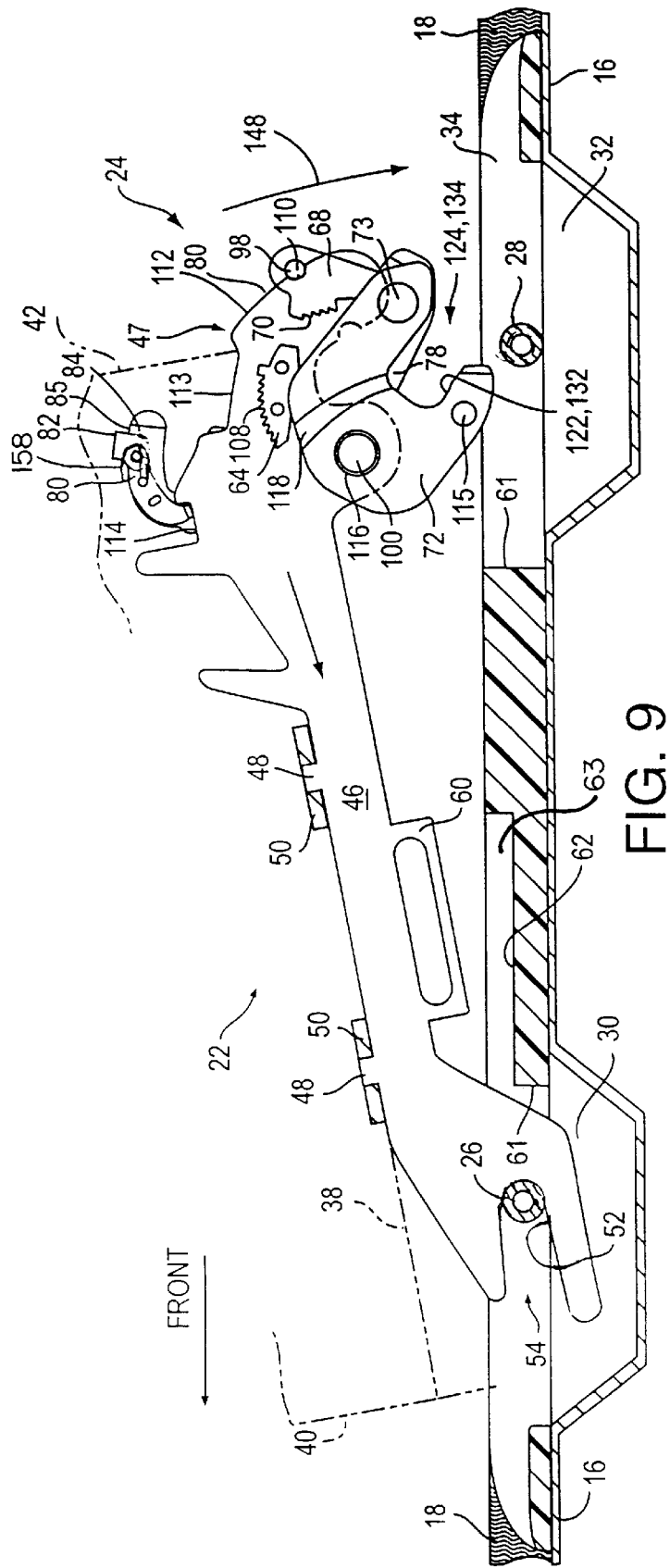
FIG. 9 of the drawings is a left side elevation view of the latch and release mechanism in a released position.

As best shown in FIGS. 4 and 9, the pad-like member 34 is formed with spaced openings 61 in the area of the forward and rearward wells 30 and 32 to enable the front anchor engaging member 52 and rearward fixed projection 56 of the support member 46 to enter within the wells 30, 32 and engage the front and rear anchor members 26 and 28. In the area between the forward and rearward spaced openings 61, the pad-like member 34 has a forward portion 62 of reduced thickness defining a seat alignment opening 63 for removably receiving the seat alignment member 60 of the support member 46. The seat alignment opening 63 of the pad-like member portion 34 cooperates with the seat alignment member 60 to insure that the seat assembly must be properly aligned before installation can proceed. Stated differently, the seat alignment member 60 is positioned and configured to engage the upwardly facing surface of the interior floor structure 12 during downward movement of the seat assembly 20 towards the interior floor structure 12 when the seat assembly 20 is improperly aligned such that the latch and release assembly 24 is prevented from engaging both the front and rear anchor member 26, 28 and being moved to one of the range of releasably locked positions. Likewise, the seat alignment member 60 is positioned and configured to be removably received within the seat alignment opening 63 during downward movement of the seat assembly 20 toward and into the operative position thereof when the seat assembly 20 is properly aligned to thereby allow the latch and release assembly 24 to engage both the front and rear anchor members 26, 28.

The latch and release mechanism 47 comprises one component fixed in place, and a number of movable components. These components function together as a simple cam and link mechanical advantage system that utilizes a contour-following roller pin to control the movement and position of other components. This cam-following action initiates several operations.

A fixed toothed element 64 is attached to the left side of the main support member 46, near the top rear of the member 46, with a pair of suitable rivets 66. Movable parts of the latch and release mechanism 47 on the left side of the main support member 46 include a left movable toothed portion 68 with a toothed surface 70 and a left movable locking member 72, which are connected together with a left fastening pin 73. The pin 73 attaches an upper extended portion 74 of the left movable locking member 72 to the lower portion of the left movable toothed portion 68 through a round opening 75 in the toothed portion 68.

Movable parts of the latch and release mechanism 47 on the right side of the main support member 46 include a right movable non-toothed portion 76, a right movable locking member 78, a lock release lever 80 (including a thumb button 82), and a manually engageable handle member 84 (including a grip 85). The handle member 84 contains a pin engagement surface 86 and a movement initiation portion 87 that are critical to disengaging the latch and release mechanism 47. The lock release lever 80 is attached to the handle member 84 with a lock release lever pin 88, at the midpoint of the lock release lever 80. The lock release lever pin 88 functions as a pivot point during the unlocking and release of the latching and releasing mechanism 47 from a releasably latched position. A lower end portion 89 of the right movable non-toothed portion 76 is fastened to the right movable locking member 78 with a right fastening pin 90. The right fastening pin 90 attaches the lower end portion 89 of the right movable non-toothed portion 76 to an upper extended portion 91 of the right movable locking member 78. Proper operating bias on the handle member 84 is provided by a biasing element in the form of a return spring 92 fastened at one end to a tab 94 on the handle member 84. The other end of the return spring 92 connects to a circumferencial groove 96 notched around an engagement end 97 of a connecting member in the form of a movable locking element pin 98. The locking element pin 98 also contains a handle engagement surface 99 that is acted on by the handle member 84 when the latch and release mechanism 47 is moved to the released position and being disengaged.

The right movable locking member 78 and the left movable locking member 72 are fastened to the right and left sides respectively of the main support member 46 with a pivot pin 100 that passes through a pivotal opening 102 in the main support member 46 to keep the handle member 84 in place. A lower extended portion 103 of the left movable locking member 72 fits flush against the main support member 46, but the left movable locking member 72 is shaped such that it bends away from the main support member 46 to allow space for the toothed surface 70 of the left movable toothed element 68 to fit between the upper extended portion 74 of the left movable locking member 72 and the left rear side of the main support member 46.

A spacing washer 104 is positioned between the handle member 84 and the main support member 46 to allow adequate space for operation of the lock release lever 80 and the handle member 84. The right movable non-toothed portion 76 and the left movable toothed portion 68 are held together by the movable locking element pin 98 that moves longitudinally along a top edge surface 106 of the rear portion of the main support member 46, adjacent to a set of teeth 108 on the toothed element 64. Together, the movable toothed portion 68 and the movable non-toothed portion move in unison about their respective pivotal connections and comprise a movable toothed element. The teeth 70 of the left movable toothed portion 68 are positioned to engage the teeth 108 on the upper surface of the fixed toothed element 64 in a releasably intermeshed relationship when the latching and releasing mechanism 47 is in one of its range of releasably latched positions which will be discussed below.

A protruding cylindrical surface 109 on the movable locking element pin 98 maintains engagement contact with the cam-like irregular top edge surface 106 (also referred to as a riding surface) along the top rear of the main support member 46. The irregular contour of the top edge surface 106 comprises four discernible regions: a notched surface region 110, a rising positively sloped region 112, a downwardly sloped plateau region 113, and a locking notch 114. The resting engagement position of the movable locking element pin 98 cylindrical surface 109 on the top edge surface 106 of the main support member 46 determines the state of the latching and releasing mechanism 47 relative to fixed engagement of the removable seat riser assembly 22 on the floor 12 of the vehicle 10. The locking notch 114 provides a facility by which the latch and release mechanism 47, when locked, is maintained in a releasably locked position until the user manually initiates an action to unlock the mechanism 47.

The thumb button 82 on the lock release lever 80 allows for unlocking and actuating the release of the latch and release mechanism 24 to disengage the two locking members 78 and 72. Downward movement of the thumb button 82 initiates an unlocking and release process that subsequently effects the toothed surface 70 on the left movable toothed portion 68 to facilitate disengagement from the toothed surface 108 on the toothed element 64. This allows the handle member 84 to be moved so as to disengage the rear of the latching and releasing mechanism 47 from the rear anchor member 28 on the rear well 32 of the vehicle floor 12, by freeing the rearward depending portion 56 forwardly facing surface 58 of the main support member 46. The main support member 46 can then be removed from the rear anchor member 28.

Referring to the drawings, particularly to FIGS. 2 through 7, there are several components of the latching and releasing mechanism 47 deserving of embellishment. These include the left movable locking member 72, the right movable locking member 78, the left movable toothed portion 68 with the teeth 70, the right movable non-toothed portion 76, the fixed toothed element 64, the lock release lever 80, the handle member 84, the movable locking element pin 98, and a spacer pin 115.

The left movable locking member 72 is forced to lock around the rear anchor member 28 by the action of the left movable toothed portion 68 with the teeth 70, as it ratchets up against the toothed element 64 during a locking operation as will be described below. The left movable locking member 72 pivots upward about the pivot pin 100 that engages the member 72 at a round pivot opening 116, rotating the left movable locking member 72 upward as the ratcheting lock action tightens. A spacing surface 118 on the member 72 provides engagement space for the left movable toothed portion 68 with the teeth 70 to properly engage the toothed surface 108 on the toothed element 64, thus ensuring complete locking action.

The left movable locking member 72 includes a gripping surface 120 which is the first surface to make contact with the rear anchor member 28 when the latching and releasing mechanism 47 initially makes contact, prior to being releasably locked. The left movable locking member 72 includes another gripping surface 122 which is the first surface to relinquish contact with the rear anchor member 28 when the latching and releasing mechanism 47 is being disengaged, prior to the riser assembly 22 being removed from the rear door 14 of the vehicle 10. The rear anchor member 28 occupies a hard point gripping area 124 in the left movable locking member 72 when the riser support structure 22 is locked in place. A cylindrical opening 126 in the left movable locking member 72 allows the left movable locking member 72 to be pinned by the left fastening pin 73 to the left movable toothed portion 68.

The right movable locking member 78 is forced to lock around the rear anchor member 28 by the action of the right movable non-toothed portion 76. The right movable non-toothed portion 76 is driven by the movement of the locking element pin 98 to follow the same path as the left movable toothed portion 68. The right movable locking member 78 also pivots upward about the pivot pin 100 that engages the right movable locking member 78 through a cylindrical opening 128, rotating the right movable locking member 78 upward as the ratcheting lock action tightens in the manner discussed in the application.

A gripping surface 130 on the right locking member 78 first makes contact with the rear anchor member 28 when the latching and releasing assembly 24 is being engaged, prior to being locked. Another gripping surface 132 on the right locking member 78 first relinquishes contact with the rear anchor member 28 when the latching and releasing assembly 24 is being disengaged, prior to the riser support structure 22 being removed from the rear door 14 of the vehicle 10. The rear anchor member 28 occupies a hard point gripping area 134 in the right locking member 78 when the riser support structure 22 is locked in place. A cylindrical opening 136 in the right locking member 78 allows the right locking member 78 to be pinned by the right fastening pin 90 to the right movable non-toothed portion 76.

The lock release lever 80 pivots about the lever pin 88 that connects the lock release lever 80 to the handle member 84. The thumb button 82 allows for the application of a force to pivot the lock release lever 80 about a lock release pivot point 138 to unlock the latching and releasing assembly 24 and subsequently disengage the right and left movable locking members 78 and 72, respectively. A force 140 applied to the thumb button 82 by the user initiates the unlocking operation through the action of a locking element 142 on the lock release lever 80 that is forced upwardly from the locking notch 114. This action results in the left movable toothed element 68 with teeth 70, and the fixed toothed element 64 that act together in the progressive locking process as a progressively ratcheting lock, to separate. A torsion spring 158 connected between the lock release lever 80 and the handle member 84 biases the release lever 80 about pin 88 to normally maintain the lever 80 engaged within the locking notch 114.

The handle member 84 is important to disengaging the riser support structure 22 from the rear anchor member 28. A spacing surface 144 on the handle member 84 allows operating space for the right movable locking member 78 to operate freely after a force is applied to the thumb button 82 and the handle member grip 85 pivots around the pivot pin 100, that connects to the handle member 84 through a handle pivot pin access opening 146.

The movable lockable element pin 98 provides the means by which the user, through the handle member 84, disengages the latching and releasing assembly 24 after the lock release lever 80 was used to unlock the assembly 24.

The spacer pin 115 connects the right locking member 78 to the left locking member 72 to maintain proper positioning of these two locking members with respect to the forwardly facing surface 58 on the rearward fixed depending projection 56 of the main support member 46, and the rear anchor member 28, when the pin 28 is engaged.

The removable riser support structure 22 is balanced to provide a stable seating platform when the seat 20 is installed in the vehicle 10. The construction of the removable riser support structure 22 provides four point stabilizing contact with the carpet 18 of the floor 12 of the vehicle 10 via the pair of longitudinally-spaced rubber mounting pads 44 attached to the bottom of the riser structure 36. The rubber mounting pads 44 are made of hard rubber and, when the removable seat riser assembly 22 is installed and locked in place, the mounting pads 44 are compressed by the downward locking force of the latching and releasing assembly 24 into the carpet 18. The compression of the rubber mounting pads 44 into the carpet 18 supplements the normal locking action of the latching and releasing assembly 24 to the vehicle floor 12 by the action of the assembly 24 and the construction of the floor area 12 where the seat 20 is mounted.

The construction of the vehicle floor 12 where the removable riser support structure 22 resides is important to the integrity of the installation. When the seat 20 is installed, the downward force required to properly position the assembly is opposed by the floor 12 of the vehicle 10 where the four rubber mounting pads 44 contact the carpet 18. The action that occurs as the seat riser assembly 22 is installed causes the riser support structure 22 to dig into and grasp the carpet 18. This downward force yieldingly compresses the carpet to a decreased thickness. The greater the downward force applied to position the riser support structure 22, the further the carpet 18 will be yieldingly compressed. If this downward force is applied in the form of an individual's body weight in the seat 20, the greater the body weight, the greater the downward force applied to position the riser support structure 22.

The front and rear wells 30 and 32 are stamped into the base metallic floor pan 16 with the front and rear anchor members 26 and 28 mounted transversely over the wells 30 and 32. When the riser support structure 22 is installed, the gripping action of the latching and releasing assembly 24 around the rear anchor member 28 and a forwardly directed downward force exerted upon the front anchor member 26 by the latching and releasing mechanism of the latching and releasing assembly 24 cause the seat riser support structure 22 to also yieldingly compress into the carpet 18.

The movable locking element pin 98 contains the protruding cylindrical surface 109 that follows or rides along the surface contours 110, 112, and 113 of the cam-like irregular top edge surface 106 (also referred to as a riding surface) of the main support member 46. The movable locking element pin 98 is forced to keep the protruding cylindrical surface 109 against the irregular contoured top edge surface 106. With the latching and releasing assembly 24 completely disengaged from the vehicle seat attaching structure pins 26 and 28, protruding cylindrical surface 109 of the movable locking element pin 98 is firmly seated in the outwardly facing recessed or notched surface region 110 on the rear top edge surface 106 of the main support member 46. In this position, the left and right movable locking members 72 and 78 are at their most disengaged, wide-open, position with respect to the gripping area created by the forwardly facing surface 58 of the rearward depending fixed projection 56 on the bottom rear portion of the main support member 46.

When the latching and releasing assembly 24 is completely engaged, and locked around the vehicle rear anchor member 28, the protruding cylindrical surface 109 of the movable locking element pin 98 is firmly positioned in the downward sloped plateau region 113 on the rear top edge surface 106 of the main support member 46. In this position, the left and right movable locking members 72 and 78 are locked around the rear seat attaching structure pin 28, and ratcheted through the range of releasably latched positions in the tightly engaged, closed position. The exact position of the protruding cylindrical surface 109 of the movable locking element pin within the downward sloped plateau region 113 depends upon the extent to which the two sets of teeth 70 and 108 have been ratcheted together (i.e., moved through the range of releasably latched positions). The ratcheted state depends on the magnitude of the external force applied to the left and right locking members 72 and 78 as they collectively engage the seat attaching structure pin 28.

The force applied to the left and right movable locking members 72 and 78 is transmitted upward by the rear anchor member 28 as the latching and releasing assembly 24 is moved downward, pivoting about the front anchor member 26. As the two movable locking members 72 and 78 are forced upward by the force exerted by contact between the vehicle rear anchor member 28 and the bottom surface of the left movable locking member 72, the left and right movable locking members 72 and 78 pivot upward around the pivot pin 100. This action causes the rear anchor member 28 to be captured between the gripping action of the left and right movable locking members, 72 and 78, and the main support member 46 in the gripping area created by the forwardly facing surface 58 of the rearward depending fixed projection 56 on the bottom rear portion of the main support member 46.

With the removable seat 20 locked in place, the locking element 142 of the lock release lever 80 is seated in the locking notch 114 on the main support member 46 and the protruding cylindrical surface 109 of the movable locking element pin 98 is positioned in the downwardly sloped plateau region 113. When the user decides to unlock and disengage the removable riser support structure 22, the user simply reaches down and grasps the grip 85 on the handle member 84 and presses the thumb button 82 on the lock release lever 80 downwardly.

Downward movement of the thumb button 82 causes the lock release lever 80 to pivot counter-clockwise about the lock-release pivot point 138 resulting in the locking element 142 being forced upward, and out from the locking notch 114. This unlocks the latch and release mechanism 47 enabling the latching and releasing assembly 24 to be moved into a released position by subsequent action of the user.

The disengagement of the latching and releasing assembly 24 is accomplished by the user moving the grip 85 on the handle member 84 rearwardly about the pivot pin 100. As the handle member 84 moves, the handle engagement surface 99 on the locking element pin 98 makes contact with the pin engagement surface 86 on the handle member 84 and travels longitudinally along the engagement surface 86 as the handle member 84 continues to move rearwardly. The irregularly curved shape of the pin engagement surface 86 causes the movable locking element pin 98 to be lifted up as the handle member 84 is moved, subsequently causing the two sets of teeth 70 and 108 to separate and become disengaged whereby the latch and release mechanism 42 is moved towards a released position.

When the handle member 84 is moved to the position where the movement initiation portion 87 of the handle member 84 is engaging the locking element pin handle engagement surface 99, the left and right movable toothed and non-toothed portions, 68 and 76, connected together by the movable element locking pin 98, will be moved in unison rearwardly away from the fixed toothed element 64. After the left and right movable toothed and non-toothed, 68 and 76, have moved past and cleared the fixed toothed element 64, the user simply releases the grip 85 on the handle member 84, completing the action necessary to move the latching and releasing assembly 24 from being releasably locked in one of the range of releasably locked positions into its released position. The user can now easily remove the seat 20 from the floor 12 of the vehicle 10.

In most known removable seat applications, the mounting latch engagement is awkward. The operational forces required to actuate the mounting latches are usually large and the operational access is often obstructed. Because the locking process associated with the present subject matter is a simple, two-step engagement process, the time and effort required to positively lock the removable seat assembly 20 in place is measured in seconds.

The latching and releasing assembly 24 securely latches the removable seat 20 to the vehicle 10 front and rear anchor members 26 and 28 while exhibiting low engagement efforts. The mechanical advantage of the latch construction allows the seat 20 to engage the rear anchor member 28 either by a moderate downward load on the seat 20 or by a moderate accelerated engagement pivoting around the front seat anchor member 26. The seat 20 is designed to engage the front anchor member 26 first, and then proceed to engage the rear anchor member 28.

The simple two-step engagement process consists of first engaging the forwardly opening slot 54 of the front anchor member 52 at the front of the latching and releasing assembly 24 with the front anchor member 26 from the rear or side of the seat 20. Then, while resting the seat 20 on the vehicle rear anchor member 28, a moderate downward force is applied to engage the latch and release mechanism 47, or accelerating the seat 20 while pivoting around the vehicle front anchor member 26 to engage the latch and release mechanism 47 with the rear anchor member 28. The latch and release link mechanism's mechanical advantage assists the engagement efforts and reduces the required engagement load.

With reference to the drawings, the initial steps in the process of locking the latching and releasing assembly 24 in place are shown in FIGS. 9 and 10. The removable seat 20 is brought into the rear door 14 of the vehicle 10 and placed in position (with the seat 20 facing forward) near the front anchor member 26 fixed in the vehicle floor 12. The rear of the seat 20 is first lifted slightly to form an acute angle with respect to the floor 12 of the vehicle 10, and the hooked (open) portion of the forwardly opening slot 54 on the front anchor engaging member 52 of the main support member 46 is lowered slightly and placed over the recessed front well 30 in a manner to removably engage the front anchor member 26. The seat 20 is then pushed forward until the front of the main support member 46 has fully engaged the vehicle front anchor member 26 and cannot continue forward. With a nominal downward force 148 applied to the rear, the latching and releasing assembly 24 then pivots downwardly around the front anchor member 26 until the latching and releasing assembly 24 is positioned in the recessed rear well 32 near the rear anchor member 28.

When the downwardly movement resulting from the applied downward force 148 causes the latching and releasing assembly 24 to reach the recessed rear well 32, additional downward motion causes the left and right movable locking members 72 and 78 to contact the rear anchor member 28.

As the manually applied downward force 148 continues to be applied to the latching and releasing assembly 24, the entire assembly 24 pivots around the front anchor member 26, with the main support member 46 eventually becoming parallel to the interior floor structure 12 of the vehicle 10. This causes the right movable locking member 78 and the left movable locking member 72 of the latch and release mechanism 47 to enter the rear well 32 and make contact with the rear anchor member 28. Making contact with the rear anchor member 28 causes the left movable locking member 72 to force the left movable toothed portion 68 with the teeth 70 upward, forcing the movable element locking pin 98 from the notched surface region 110 in the rear top edge surface 106 of the main support member 46, and enabling the teeth 70 to initially engage the teeth 108 of the fixed toothed element 64 where such that the latch and release mechanism is in an initial one of its range of releasably latched positions.

As the ratcheting action continues and the latch and release mechanism 47 continues to be moved progressively further through its range of releasably latched positions, the left and right movable locking members 72 and 78 tighten their grip around the rear anchor member 28, the movable element locking pin protruding cylindrical surface 109 moves to somewhere in the downwardly sloped plateau region 113, the ratcheting-locking area, on the rear top edge surface 106 of the main support member 46 where the locking pin 98 protruding cylindrical surface 109 will remain fixed until the latching and releasing assembly 24 is moved to its released position. During this ratcheting action, the carpet 18 is compressed to a decreased thickness corresponding to the extent to which the latch and release mechanism 47 has been ratcheted through its range of releasably latched positions. When the locking pin protruding cylindrical surface 109 reaches the plateau region 113, the locking element 142 on the lock release lever 80 engages the locking notch 114. When this occurs the latching and releasing assembly 24 is releasably locked in place as the locking element 142 is firmly positioned in the locking notch 114.

Stated differently, during this installation process, the seat assembly 20 is moved downwardly towards the interior floor structure 12 in response to an application of a downwardly directed force to the seat assembly 20 such that the yieldingly deformable material (i.e. carpet 18) is compressed to a decreased thickness between the riser support structure 22 and the interior floor structure 12. The latch and release mechanism 47 moves from an initial one of the range of releasably latched positions to subsequent one of the range of releasably latched positions corresponding to the decreased thickness of the yieldingly deformable material. The latch and release mechanism 47 is releasably locked in the subsequent one of its range of releasably latched positions to thereby prevent upward movement of the seat assembly 20 from the floor structure 12 and to maintain the yieldingly deformable material at the aforesaid decreased thickness by virtue of the latch and release mechanism being engaged with the rear anchor member 28.

In the broadest scope of the present invention, the latch and release assembly 24 moves through a range of releasably locked positions whereby the seat assembly 20 can be forced downwards towards the vehicle floor 12 so as to compress the carpet 18. A latching/ratcheting mechanism is a preferred way of accomplishing this desired progressive movement.

Like the seat engagement process, the latch disengagement process is also awkward in most known removable seat applications. Because the unlocking and disengagement process associated with the removable seat riser assembly 22 is a simple, two-step unlocking and disengagement process followed by a one-step removal process, the time and effort required to completely disengage and remove the seat 20 through the rear door 14 of the vehicle 10 is also greatly reduced.

The handle member 84 is operated from either the rear or the side of the seat 20, and the latch and release mechanism 47 cam and link system's mechanical advantage utilizes a cam-type device to disengage the latch and reduce the load necessary for disengagement. This minimizes the disengagement process, and because the latch disengagement only requires a moderate force to operate the cam and link mechanical advantage system, and the handle member 84 is located at the rear of the seat 20, removal is greatly simplified.

FIGS. 11 and 12 show how the latching and releasing assembly 24, is unlocked. The thumb button 82 on the lock release lever 80 allows for manually unlocking the latching and releasing assembly 24. Downward movement of the thumb button 82 initiates an unlocking operation as previously described that subsequently results in the teeth 70 on the left movable toothed portion 68 disengaging from the teeth 108 on the fixed toothed element 64, thus allowing the handle member 84 to be operated to disengage the latching and releasing assembly 24 from the rear anchor member 28 on the interior floor structure 12 of the vehicle 10. The main support member 46 can then be manually disengaged and removed from the rear anchor member 28 securing the latching and releasing assembly 24 to the vehicle floor 12.

Figure 6:
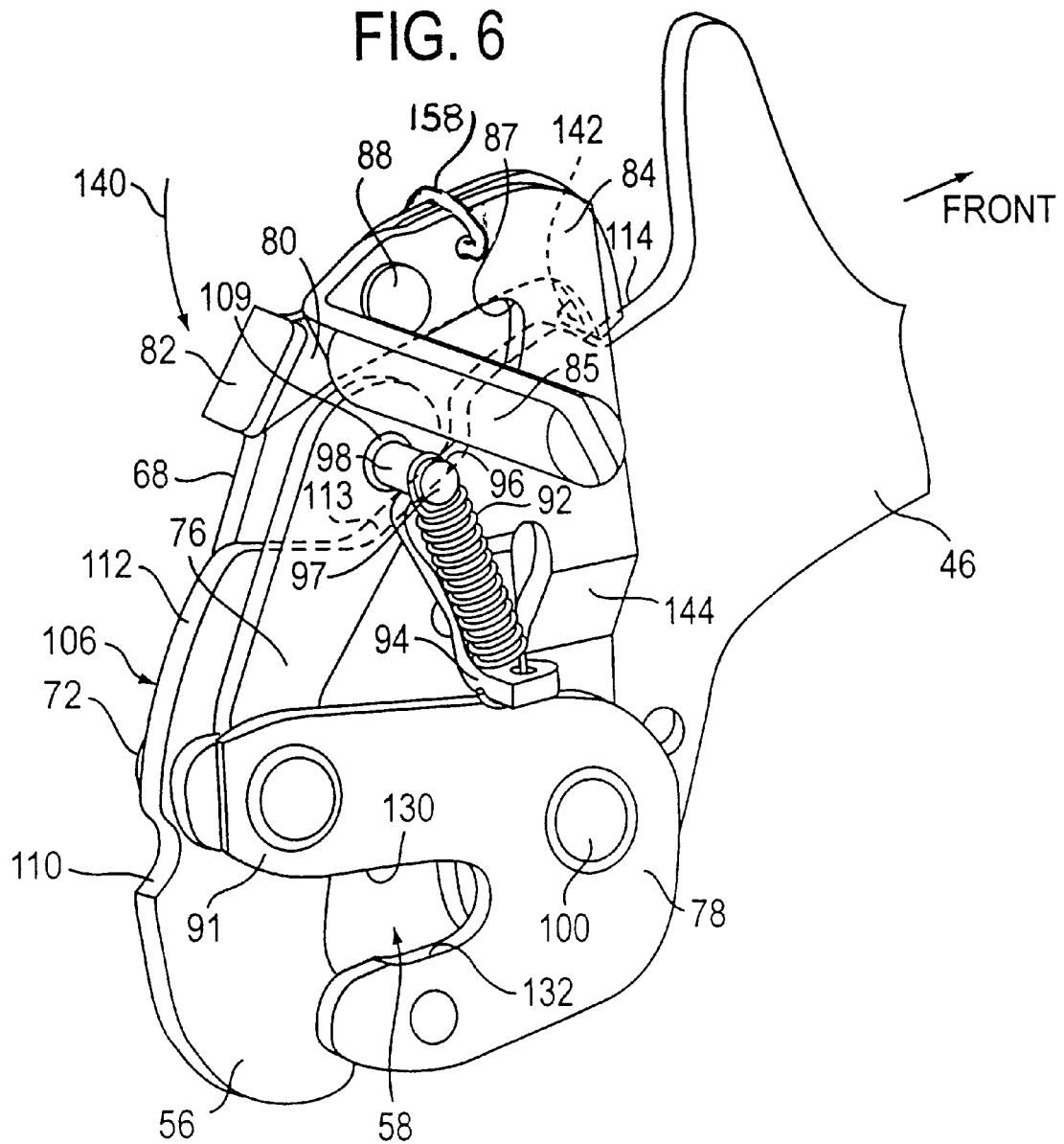
FIG. 6 of the drawings is a rear perspective view of the latch and release mechanism.
Figure 7:
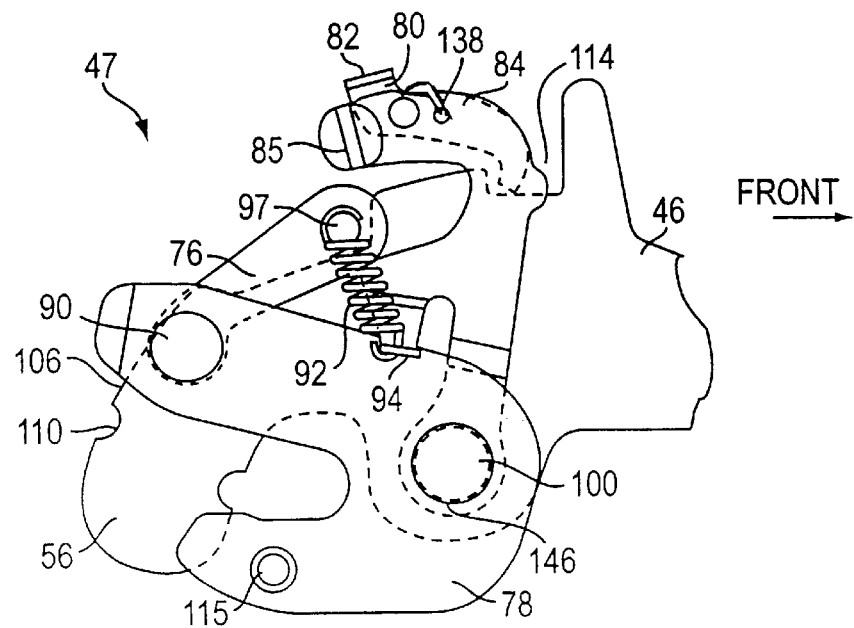
FIG. 7 of the drawings is an elevation view of the right side of the mechanism shown in FIG. 6.
Figure 8:
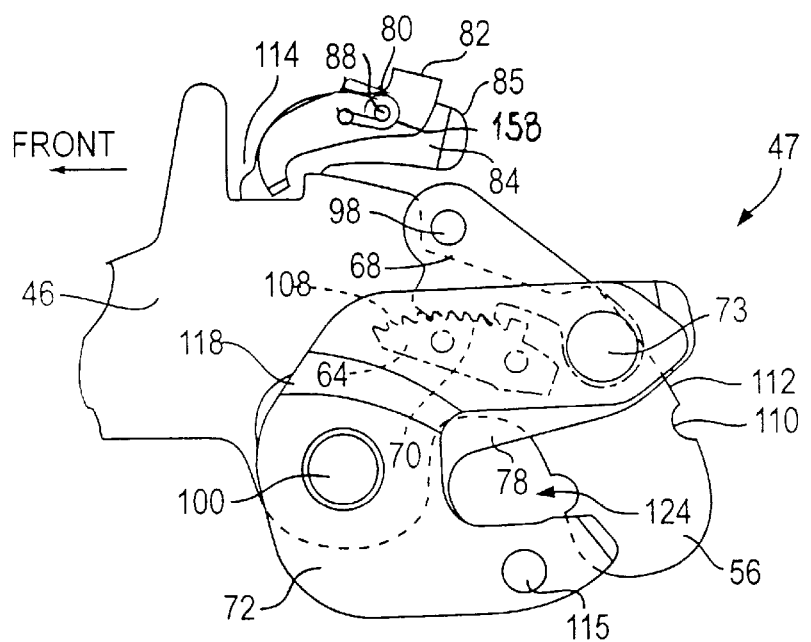
FIG. 8 of the drawings is an elevation view of the left side of the mechanism shown in FIG. 6.

As shown on FIG. 12, after the latch and release mechanism 47 is unlocked and disengaged, upward motion of the latching and releasing assembly 24 initiated by an applied upward force 150 will allow the assembly 24 to clear the rear anchor member 28, as the left and right movable locking members 72 and 78 are again fully open. The movable toothed element 68 with teeth 70 is disengaged from the fixed toothed element 64, and the movable locking element pin 98 is in the disengaged notched surface region 110 on the contoured rear top edge surface 106 of the main support member 46, thereby holding the latching and releasing assembly 24 in the released position. As shown in FIG. 6, when the handle member 84 is released, the tension in the return spring 92, now in the extended position, returns the handle member 84 and the lock release lever 80 to their original positions. The removable seat assembly 20 is now free from restraint, and can easily be removed from the vehicle 10 through the rear door 14.

Like the engagement and disengagement of the removable seat assembly 20 addressed above, the removal process is also awkward in most known removable seat applications. The forces required to remove the seat are usually large and the operational access is often obstructed. Because of a simple one-step removal process, the time and effort required to completely remove the seat through the rear door 14 of the vehicle 10, is reduced. The entire removal process consists of simply lifting up the rear of the seat 20, and lifting the seat 20 upward and away from the front seat attaching structure pin 26, towards the rear door 14 of the vehicle 10, and out the vehicle rear door 14. In most vehicles that convert the passenger compartment to a cargo compartment the removable seats are not conducive to removal from the rear of the vehicle. Because of the seat configuration and the simplified removal process associated with the removable seat riser assembly 22, these shortcomings are eliminated.

The process of removing the latching and releasing assembly 24 from the vehicle 10 is shown in FIG. 13. After the latching and releasing assembly 24 has been unlocked (released) and disengaged from the floor 12 of the vehicle 10, it is a simple matter to remove the assembly 24 by lifting it slightly, enough for the front of the main support member 46 to clear the rear of the front well 30, and applying a moderate upward force 152 towards the rear of the vehicle 10.

Any patents or patent application mentioned hereinabove are hereby incorporated by reference into the present application.

While the invention has been described in connection with what is presently considered to be the most practical and preferred embodiment of the invention, it is understood that the invention is not limited to the disclosed embodiment but, on the contrary, is intended to cover various modifications and equivalent arrangements included within the spirit and scope of the appended claims.

What is claimed is:

1. A removable vehicle seat assembly for use with a motor vehicle having an upwardly facing interior floor structure with at least a portion thereof covered by a yieldingly deformable material, the interior floor structure having front and rear anchor members fixedly mounted thereon, said removable vehicle seat assembly comprising:

a seat assembly constructed and arranged to support an occupant seated thereon when said removable vehicle seat assembly is removably mounted in an operative position on the interior floor structure of the motor vehicle;

a riser support structure constructed and arranged to encase the yieldingly deformable material on the interior floor structure and support said seat assembly when said removable vehicle seat assembly is removably mounted in the operative position thereof;

a manually operable latch and release assembly operatively associated with said riser support structure, said latch and release assembly being positioned and configured to be removably engaged with the front and rear anchor members of the interior floor structure when said removable vehicle seat assembly is removably mounted in the operative position thereof, said latch and release assembly being movable through a range of releasably locked positions and an unlocked position said latch and release assembly being constructed and arranged to cooperate with the front and rear anchor members to releasably retain said vehicle seat assembly in the operative position thereof when said latch and release assembly is removably engaged with the front and rear anchor members and moved to one of the range of releasably locked positions, said latch and release assembly being constructed and arranged to allow for disengagement thereof from the front and rear anchor members and subsequent removal of said vehicle seat assembly from the vehicle when said latch and release mechanism is moved to the unlocked position thereof.

said latch and release assembly being constructed and arranged such that, when said latch and release assembly is engaged with said front and rear anchor members and releasably locked in an initial one of said range of releasably locked positions, applying a downwardly directed force to said vehicle seat assembly causes said riser support structure to yieldingly compress the yieldingly deformable material covering at least a portion of the interior floor structure from an initial thickness to a decreased thickness against the interior floor structure and causes said latch and release assembly to move progressively from said initial one of said range of releasably locked positions to a subsequent one of said range of releasably locked positions corresponding to the decreased thickness of the yieldingly deformable material, said latch and release assembly being constructed and arranged to prevent upward movement of said removable vehicle seat assembly away from the interior floor structure to thereby maintain the yieldingly deformable material at the aforesaid decreased thickness when said latch and release assembly is engaged with the front and rear anchor members and releasably locked in said subsequent one of said range of releasably locked positions.

2. A removable vehicle seat assembly according to claim 1, wherein said latch and release assembly comprises:

a front anchor engaging member positioned and configured to be removably engaged with the front anchor member of the interior floor structure, a latch and release mechanism operatively associated with a rearward portion of said riser support structure, said latch and release mechanism being positioned and configured to be engaged with the rear anchor member of the interior floor structure and releasably locked in one of a range of releasably latched positions when said removable vehicle seat assembly is removably mounted in the operative position thereof, said latch and release mechanism providing said latch and release assembly with said range of releasably locked positions and said unlocked position, said front anchor engaging member and said latch and release mechanism cooperating with the front and rear anchor members to thereby removably retain said removable vehicle seat assembly in the operative position thereof when said front anchor engaging member is removably engaged with the front anchor member and said latch and release mechanism is engaged with the rear anchor member and releasably locked in one of said range of releasably latched positions thereof.

3. A removable vehicle seat assembly according to claim 2, wherein said latch and release mechanism includes a fixed toothed element and a movable toothed element, said movable and fixed toothed elements each having sets of teeth configured to engage with each other in a releasably intermeshed relationship to thereby prevent relative movement between said movable and fixed toothed elements when said latch and release mechanism is releasably locked in one of said range of releasably latched positions.

4. A removable vehicle seat assembly according to claim 3, wherein said teeth on said movable toothed element are configured to be cammed out of the aforesaid releasably intermeshed relationship with said teeth on said fixed toothed element during progressive movement of said latch and release mechanism through said range of releasably latched positions thereof such that said latch and release mechanism moves progressively through said range of releasably latched positions in a ratcheting manner.

5. A removable vehicle seat assembly according to claim 4, wherein a biasing element biases said movable toothed element towards and into the aforesaid releasably intermeshed engagement with said fixed toothed element.

6. A removable vehicle seat assembly according to claim 3, wherein said removable vehicle seat assembly is removably mounted in the operative position thereof by removably engaging said front anchor engaging member with the front anchor member of the interior floor structure and pivoting said removable vehicle seat assembly about the front anchor member until said latch and release mechanism engages said rear anchor member and is releasably locked in one of said range of releasably latched positions.

7. A removable vehicle seat assembly according to claim 6, wherein said riser support structure has a fixed projection depending downwardly adjacent to said latch and release mechanism, said latch and release mechanism including a movable locking member having a manually engageable handle member attached thereto, said movable locking member being positioned and configured to be engaged with the rear anchor member of the interior floor structure and moved to a removably locked position when said removable vehicle seat assembly is removably mounted in the operative position thereof and said latch and release mechanism is releasably locked in one of said range of releasably latched positions thereof, said movable locking member being movable to an unlocked position when said latch and release mechanism is moved to said released position thereof, said movable locking member cooperating with said front anchor engaging member to removably retain said removable vehicle seat assembly in the operative position thereof when said front anchor engaging member is removably engaged with the front anchor member and said movable locking member is engaged with the rear anchor member and in said removably locked position thereof.

8. A removable seat assembly according to claim 7, wherein said movable toothed element comprises:

a movable toothed portion pivotally connected to said movable locking member and disposed adjacent one side of said fixed projection depending downwardly from said riser support structure, a movable non-toothed portion pivotally connected to said movable locking member and disposed adjacent another side of said fixed projection opposite said one side, said movable toothed portion and said movable non-toothed portion being connected to one another by a connecting member so that said portions move pivotally in unison about the respective pivotal connections thereof.

9. A removable vehicle seat assembly according to claim 8, wherein said fixed projection has an arcuate riding surface provided thereon, said movable toothed element being constructed and arranged such that said connecting member rides along the arcuate riding surface of said fixed projection during movement of said latch and release mechanism between one of said range of releasably latched positions thereof and said released position thereof, said arcuate riding surface of said fixed locking member having an outwardly facing recess formed thereon, said outwardly facing recess being, positioned and configured such that said connecting member of said movable toothed element is releasably retained within said outwardly facing recess when said latch and release mechanism is in said released position thereof.

10. A removable vehicle seat assembly according to claim 7, wherein said movable locking member comprises a pair of movable locking portions pivotally mounted on opposing sides of said fixed projection.

11. A removable vehicle seat assembly according to claim 2, wherein said latch and release mechanism moves from the released position thereof to the initial one of said range of releasably latched positions thereof in response to engagement of said latch and release mechanism with the rear anchor member of the interior floor structure.

12. A removable vehicle seat assembly according to claim 2, wherein said front anchor engaging member has a forwardly facing slot configured to be removably engaged with the front anchor member of the interior floor structure.

13. A removable vehicle seat assembly according to claim 2, wherein said front anchor engaging member and said latch and release mechanism are provided on a main support member, said main support member being fixedly attached to said riser support structure.

14. A removable vehicle seat assembly according to claim 7, wherein said riser support structure has rubber mounting pads provided on a bottom surface thereof, said rubber mounting pads being forced downwardly into and compressing the yieldingly deformable material covering the interior floor structure when the aforesaid downwardly directed force is applied to said removable vehicle seat assembly.

15. A removable vehicle seat assembly according to claim 2, further comprising a seat alignment member depending downwardly from said removable vehicle seat assembly, said seat alignment member being positioned and configured to be removably received within an upwardly facing seat alignment opening provided on the interior floor structure generally between the front and rear anchor members during downward movement of said removable vehicle seat assembly towards and into the operative position thereof such that said latch and release mechanism is allowed to engage the rear anchor member and be releasably locked in one of said releasably latched positions, said seat alignment member being positioned and configured to engage the upwardly facing surface of the interior floor structure when said removable vehicle seat assembly is improperly aligned with respect to the front and rear anchor members and being moved downwardly towards the interior floor structure such that the latch and release mechanism is prevented from engaging the upwardly facing surface of said interior floor structure.

16. A removable vehicle seat assembly according to claim 15, wherein said seat alignment member depends downwardly from and is formed integrally with said riser support structure.

17. A removable vehicle seat assembly according to claim 16, wherein said seat alignment member is disposed between said front anchor engaging member and said latch and release mechanism.

18. A removable vehicle seat assembly according to claim 17, wherein said seat alignment member has a length measured in a fore and aft direction of the removable vehicle seat assembly which is substantially greater than a width thereof measured in a transverse direction of said removable vehicle seat assembly.

19. A removable vehicle seat assembly according to claim 15, wherein said riser support structure has rubber mounting pads provided on a bottom surface thereof, said rubber mounting pads being forced downwardly into and compressing the yieldingly deformable material covering the interior floor structure when the aforesaid downwardly directed force is applied to said removable vehicle seat assembly.

20. A removable vehicle seat assembly for use with a motor vehicle having an upwardly facing interior floor structure with at least a portion thereof covered by a yieldingly deformable material, the interior floor structure having front and rear anchor members fixedly mounted thereon, said removable vehicle seat assembly comprising:

a seat assembly constructed and arranged to support an occupant seated thereon when said removable vehicle seat assembly is removably mounted in an operative position on the interior floor structure of the motor vehicle;

a riser support structure constructed and arranged to engage the yieldingly deformable material on the interior floor structure and support said seat assembly when said removable vehicle seat assembly is removably mounted in the operative position thereof;

a manually operable latch and release assembly operatively associated with said riser support structure, said latch and release assembly being positioned and configured to be engaged with the front and rear anchor members of the interior floor structure when said removable vehicle seat assembly is removably mounted in the operative position thereof, said latch and release assembly being movable through a range of releasably positions, said latch and release assembly being constructed and arranged to cooperate with the front and rear anchor members of the interior floor structure to removably retain said removable vehicle seat assembly in the operative position thereof when said latch and release assembly is removably engaged with the front and rear anchor members and releasably locked in one of said range of releasably locked positions thereof;

said latch and release assembly being movable to a released position in response to manual operation when engaged with the front and rear anchor members of the interior floor structure to thereby allow an operator to disengage said latch and release assembly from the front and rear anchor members of the interior floor structure so as to allow said removable vehicle seat assembly to be moved out of the operative position thereof and removed from the motor vehicle;

said latch and release assembly being constructed and arranged to be engaged with said front and rear anchor members and releasably locked in an initial one of said range of releasably locked positions during movement of said removable vehicle seat assembly into said operative position thereof, said latch and release assembly being constructed and arranged such that, when said latch and release assembly is engaged with said front and rear anchor members and releasably locked in said initial one of said range of releasably locked positions, applying a downwardly directed force to said vehicle seat assembly causes said riser support structure to yieldingly compress the yieldingly deformable material covering at least a portion of the interior floor structure from an initial to a decreased thickness against the interior floor structure and causes said latch and release assembly to move progressively from said initial one of said range of releasably locked positions to a subsequent one of said range of releasably locked positions corresponding to the decreased thickness of the yieldingly deformable material, said latch and release assembly being constructed and arranged to prevent upward movement of said removable vehicle seat assembly away from the interior floor structure to thereby maintain the yieldingly deformable material at the aforesaid decreased thickness when said latch and release assembly is engaged with the front and rear anchor members and releasably locked in said subsequent one of said range of releasably locked positions.

21. A removable vehicle seat assembly according to claim 20, wherein said latch and release assembly comprises:

a front anchor engaging member positioned and configured to be removably engaged with the front anchor member of the interior floor structure, a latch and release mechanism operatively associated with a rearward portion of said riser support structure, said latch and release mechanism being positioned and configured to be engaged with the rear anchor member of the interior floor structure and releasably locked in one of a range of releasably latched positions when said removable vehicle seat assembly is removably mounted in the operative position thereof, said latch and release mechanism providing said latch and release assembly with said range of releasably locked positions and said released position, said front anchor engaging member and said latch and release mechanism cooperating with the front and rear anchor members to thereby removably retain said removable vehicle seat assembly in the operative position thereof when said front anchor engaging member is removably engaged with the front anchor member and said latch and release mechanism is engaged with the rear anchor member and releasably locked in one of said range of releasably latched positions thereof.

22. A removable vehicle seat assembly according to claim 21, wherein said latch and release mechanism includes a fixed toothed element and a movable toothed element, said movable and fixed toothed elements each having sets of teeth configured to engage with each other in a releasably intermeshed relationship to thereby prevent relative movement between said movable and fixed toothed elements when said latch and release mechanism is releasably locked in one of said range of releasably latched positions.

23. A removable vehicle seat assembly according to claim 22, wherein said teeth on said movable toothed element are configured to be cammed out of the aforesaid releasably intermeshed relationship with said teeth on said fixed toothed element during progressive movement of said latch and release mechanism through said range of releasably latched positions thereof such that said latch and release mechanism moves progressively through said range of releasably latched positions in a ratcheting manner.

24. A removable vehicle seat assembly for use with a motor vehicle having an interior floor structure with an upwardly facing surface and front and rear anchor members, the interior floor structure having an upwardly facing seat alignment opening provided thereon generally between the front and rear anchor members, said removable vehicle seat assembly comprising:

a seat structure constructed and arranged to support an occupant seated thereon when said removable vehicle seat assembly is removably mounted in an operative position on the interior floor structure of the motor vehicle;

a riser support structure constructed and arranged to support said seat structure when said removable vehicle seat assembly is removably mounted in the operative position thereof;

a manually operable latch and release assembly operatively associated with said riser support structure, said latch and release assembly being positioned and configured to be engaged with the front and rear anchor members of the interior floor structure when said removable vehicle seat assembly is removably mounted in the operative position thereof;

said latch and release assembly including a latch and release mechanism associated with one end of said riser support structure, said latch and release mechanism being constructed and arranged to be engaged with one of the front and rear anchor members of the interior floor structure and releasably locked in a releasably latched position when said removable vehicle seat assembly is removably mounted in the operative position thereof, a seat alignment member depending downwardly from said removable vehicle seat assembly, said seat alignment member being positioned and configured to be removably received within the seat alignment opening provided on the interior floor structure generally between the front and rear anchor members during downward movement of the seat assembly towards and into the operative position thereof such that said latch and release mechanism is allowed to engage said one of the front and rear anchor members and be releasably locked in said releasably latched position thereof, said seat alignment member being positioned and configured to engage the upwardly facing surface of the interior floor structure when said removable vehicle seat assembly is improperly aligned with respect to said front and rear anchor members and being moved downwardly towards the interior floor structure such that latch and release mechanism is prevented from engaging the upwardly facing surface of said interior floor structure.

25. A removable vehicle seat assembly according to claim 24, wherein said latch and release assembly comprises:

a front anchor member engaging member positioned and configured to be removably engaged with the front anchor member of the interior floor structure, said latch and release mechanism being operatively associated with a rearward portion of said riser support structure, said latch and release mechanism being positioned and configured to be engaged with the rear anchor member of the interior floor structure when said removable vehicle seat assembly is removably mounted in the operative position thereof, said front anchor engaging member and said latch and release mechanism cooperating with the front and rear anchor members to thereby removably retain said removable vehicle seat assembly in the operative position thereof when said front anchor engaging member is removably engaged with the front anchor member and said latch and release mechanism is engaged with the rear anchor member and releasably locked in said releasably latched positions thereof.

26. A removable vehicle seat assembly according to claim 25, wherein said seat alignment member depends downwardly from and is formed integrally with said riser support structure.

27. A removable vehicle seat assembly according to claim 26, wherein said seat alignment member is disposed directly between said front anchor engaging member and said latch and release mechanism.

28. A removable vehicle seat assembly according to claim 27, wherein said seat alignment member has a length measured in a fore and aft direction of the removable vehicle seat assembly which is substantially greater than a width thereof measured in a transverse direction of said removable vehicle seat assembly.

29. A removable vehicle seat assembly according to claim 26, wherein said front anchor engaging member and said latch and release mechanism are provided on a main support member, said main support member being fixedly attached to said riser support structure.

30. A removable vehicle seat assembly according to claim 25, wherein said front anchor engaging member has a forwardly facing slot configured to removably engage the front anchor member of the interior floor structure.

31. A removable vehicle seat assembly according to claim 25, wherein said removable vehicle seat assembly is removably mounted in the operative position thereof by removably engaging said front anchor engaging member with the front anchor member of the interior floor structure and pivoting said removable vehicle seat assembly about the front anchor member until said latch and release mechanism engages said rear anchor member and is releasably locked in said releasably latched position thereof.

* * * * *

UNITED STATES PATENT AND TRADEMARK OFFICE
CERTIFICATE OF CORRECTION

PATENT NO.    : 5,997,069
DATED         : December 7, 1999
INVENTOR(S)   : Robert T. Coffey et al.

Page 1 of 1

It is certified that error appears in the above-identified patent and that said Letters Patent is hereby corrected as shown below:

<u>Title page,</u>
Item [73], should read as follows:

-- Atoma International, Inc., Newmarket, Canada --

Signed and Sealed this

Seventeenth Day of June, 2003

JAMES E. ROGAN
*Director of the United States Patent and Trademark Office*